United States Patent
Waddington et al.

[19]

[11] Patent Number: 5,850,547
[45] Date of Patent: *Dec. 15, 1998

[54] METHOD AND APPARATUS FOR PARALLEL PROCESSING AGGREGATES USING INTERMEDIATE AGGREGATE VALUES

[75] Inventors: William H. Waddington, Foster CIty; Jeffrey I. Cohen, Mountain View, both of Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 780,591

[22] Filed: Jan. 8, 1997

[51] Int. Cl.⁶ .................................................. G06F 9/40
[52] U.S. Cl. .......................................... 395/672; 395/676
[58] Field of Search ................................. 395/607, 382, 395/376, 676, 672

[56] References Cited

U.S. PATENT DOCUMENTS 5,640,554  6/1997  Take ........................................ 395/607
5,671,382  9/1997  Shintani et al. ........................ 395/391

OTHER PUBLICATIONS

Avi Silberschalz; "Database System Concepts" 1986 by McGraw–Hill, Inc. pp. 270–274.

"Encapsulation of Parallelism In The Volcano Query Processing System", Goetz Graefe, University of Colorado, pp. 102–111, 1990.

Primary Examiner—Krisna Lim
Attorney, Agent, or Firm—Blakely, Sokoloff, Taylor & Zafman LLP

[57] ABSTRACT

The present invention performs parallel processing of aggregate functions in a computing system. Partitioned into multiple subsets of data and each of the multiple subsets of data is allocated to one of a plurality of processes. Intermediate aggregations are performed in parallel by the plurality of processes on each of the multiple subsets of data. Each intermediate aggregation yields at least one intermediate value, wherein the at least one intermediate value is represented in an internal type format. The intermediate values from each of the intermediate aggregations are merged into a final aggregation value.

20 Claims, 4 Drawing Sheets

METHOD AND APPARATUS FOR PARALLEL PROCESSING AGGREGATES USING INTERMEDIATE AGGREGATE VALUES

FIELD OF THE INVENTION

This invention relates to the field of database management. Specifically, this invention relates to a method and apparatus for parallel processing queries with aggregate functions.

BACKGROUND OF THE INVENTION

Systems such as Oracle™, Volcano™ and the Sybase MPP Server™ (formerly the NCR/AT&T Navigation Server™) decompose queries into a collection of "serial query plans." Many of these systems also use multiple processes to process these serial query plans in parallel, instead of serially. The data for the query flows through "pipelines" connecting the multiple processes and each group of processes may execute a portion of the serial plan in parallel, on distinct subsets of the data. Additionally, groups of processes may also take as input the output of other groups of processes.

Queries may contain aggregate functions such as the functions MAX, MIN, AVG, SUM, STDDEV, VARIANCE and COUNT. When aggregation functions are performed in parallel, a first set of processes performs part of the work, and a final process or group of processes produces the final result. For example, when run against a table in an Oracle™ database, the Structured Query Language (SQL) query "SELECT AVG (SAL) FROM EMP GROUP BY DEPTNO" produces an average salary of EMP grouped by DEPTNO. This query essentially produces an average salary of the employees in each department. When the query is decomposed, the data is sorted by the department number DEPTNO, which is the GROUP BY "key." Thus, for example, if there are ten department numbers, the group by will sort the data into ten subsets of data. Each subset of data is then averaged by a process in the first group. A final process simply outputs the averages from each process in the first group.

In some situations, however, the partitioning key may only have a few distinct values, which severely limits the degree of parallelism. If there are only ten departments in the above example, then the degree of parallelism is limited to ten. The distribution of the data may also be uneven. If 80% of the employees are in a single department, then the process handling that partition performs 80% of the work.

Additionally, when a query is issued against a table, the following drawback becomes apparent as the query is processed. After the query is issued, a "tablescan" is performed to retrieve the appropriate set of data from table. In the SQL query "SELECT AVG (SAL) FROM EMP GROUP BY DEPTNO", GROUP BY separates the salary data by department and the AVG (SAL) function divides the sum of all the salaries by the count of all salaries for each department group. Data is first partitioned among a first group of processes, process group 1. Then, each process in process group 1 computes an "intermediate average" for each subset of data in its set of data. The serial query for process group 1 is "SELECT DEPTNO, COUNT (SAL), SUM (SAL) FROM emp_subset GROUP BY DEPTNO", where emp_subset represents the subset of the EMP table allocated to each process. The output of process group 1 includes intermediate averages, and can be represented as a temporary table T1 with three columns: DEPTNO, COUNT_SAL, and SUM_SAL.

The final process then performs the final aggregation. Data is collected from each process and re-grouped by department. The intermediate aggregates are merged and then the sum of counts (COUNT_SAL) is divided by the sum of salaries (SUM_SAL), producing the final aggregate (final average grouped by department). The serial query for the final process is SUM (T1.COUNT_SAL) FROM T1 GROUP BY DEPTNO."

In order to perform the above steps, the serial query mechanism must understand how to decompose each aggregate function into base SQL functions. In the previous example, AVG(SAL) is transformed into the functions COUNT (SAL) and SUM (SAL), and then the sum of the counts is divided by the sum of the salaries to produce the final result. The serial query mechanism must therefore perform multiple SQL functions for each aggregate function, and transform the data to and from the internal intermediate aggregate representation multiple times. In addition, the serial query mechanism may produce redundant aggregate expressions for complex expressions.

It is therefore desirable for an improved method and apparatus for parallel processing aggregate functions.

SUMMARY OF THE INVENTION

The present invention provides an improved method and apparatus for parallel processing aggregate functions in a computing system, where the computer system includes a plurality of processes. According to one embodiment of the invention, a set of data is partitioned into multiple subsets of data. Each of the multiple subsets of data is allocated to one of the plurality of first processes according to a predetermined mapping function. Intermediate aggregations are performed on each of the multiple subsets of data. Each intermediate aggregation yields one intermediate value per subset of data, wherein the at least one intermediate value is represented in an internal type format. Finally, the intermediate values from each of the intermediate aggregations are redistributed to a second set of processes and merged into a final aggregation value.

Other features and advantages of the present invention will be apparent from the accompanying drawings and from the detailed description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

The present invention is an improved method and apparatus for parallel processing of aggregations that avoids the limitations of the previous method. In the following detailed description, numerous specific details are set forth in order to provide a thorough understanding of the present invention. It will be apparent to one of ordinary skill in the art, however, that these specific details need not be used to practice the present invention. In other instances, well known structures, interfaces, and processes have not been shown in detail in order not to unnecessarily obscure the present invention.

Figure 1:
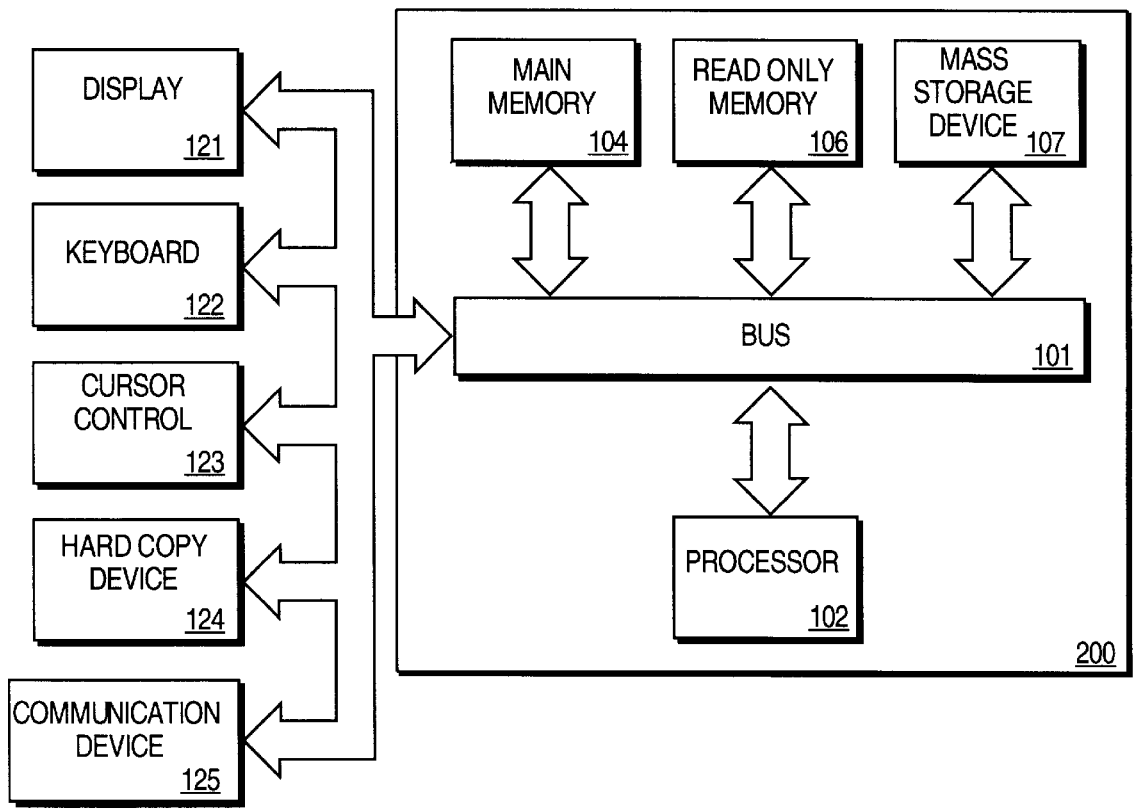
FIG. 1 illustrates a typical computer system upon which an embodiment of the present invention can be implemented.

Referring to FIG. 1, the computer system upon which an embodiment of the present invention can be implemented is shown as 100. Computer system 100 comprises an internal bus or other communication means 101 for communicating information, and processing means 102 coupled with internal bus 101 for processing information. Computer system 100 may also include multiple processing means 102, for parallel processing of data.

System 100 further comprises a random access memory (RAM) or other dynamic storage device 104 (referred to as main memory), coupled to internal bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to internal bus 101 for storing static information and instructions for processor 102. Data storage device 107 is coupled to internal bus 101 for storing information and instructions.

A data storage device 107 such as a magnetic disk or optical disc and its corresponding drive can be coupled to computer system 100. Computer system 100 can also be coupled via internal bus 101 to a display device 121, such as a cathode ray tube (CRT), for displaying information to a computer user. An alphanumeric input device 122, including alphanumeric and other keys, is typically coupled to internal bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed data repository on a computer screen can be selected by using a stylus or pen to touch the displayed data repository. The computer detects the selection by implementing a touch sensitive screen. Similarly, a light pen and a light sensitive screen can be used for selecting a displayed data repository. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to perform parallel processing of aggregations on a set of data retrieved from a database. According to one embodiment, "intermediate aggregations" are performed in parallel by a plurality of processes in computer system 100 in response to processor 102 executing sequences of instructions contained in memory 104. An intermediate aggregation is an aggregation function performed on a subset of the data retrieved. The results of the intermediate aggregations are merged or "rolled up" into a final aggregation value. In alternative embodiments of the present invention, hardwired circuitry may be used in place of or in combination with software instructions to implement the present invention. Thus, the present invention is not limited to any specific combination of hardware circuitry and software.

Figure 2:
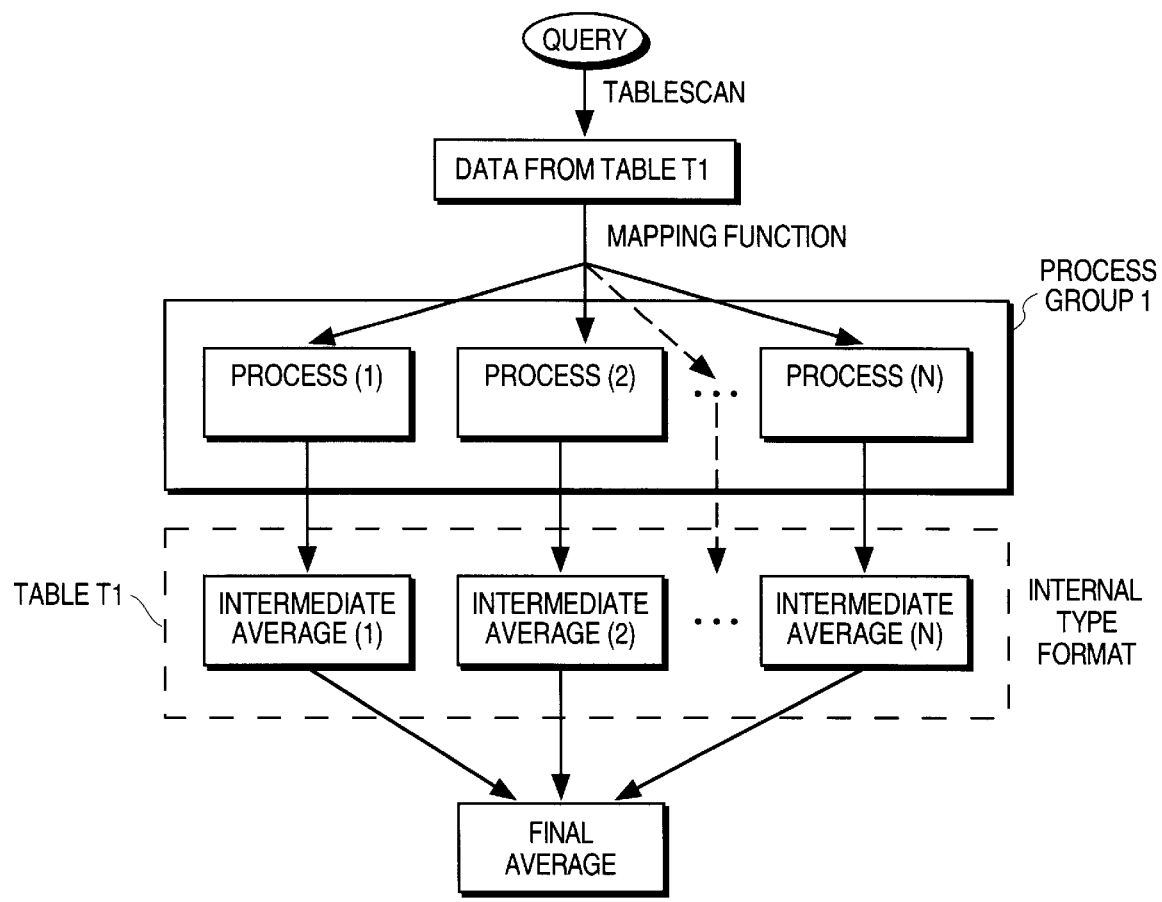
FIG. 2 illustrates conceptually one embodiment of the present invention.

FIG. 2 illustrates conceptually an embodiment of the present invention. To overcome the limitations in the prior art, according to one embodiment of the present invention, the serial SQL query mechanism is extended to process the intermediate aggregate function and values, and the aggregation functions are extended to produce and take as input intermediate aggregates values. As in the prior art described above, when aggregation functions are performed in parallel, a first set of processes performs part of the work, and a final process or group of processes produces the final result. The intermediate values in this embodiment, however, differ from the prior art.

For example, in the SQL query described above, namely "SELECT AVG (SAL) FROM EMP GROUP BY DEPTNO," the first serial query according to one embodiment is "SELECT DEPTNO, AVG_intermediate (SAL) FROM emp_subset GROUP BY DEPTNO." The final query is "SELECT AVG_final (T1.SAL) FROM T1 GROUP BY DEPTNO." According to this embodiment T1 only has two columns, DEPTNO and SAL, instead of the three columns in the prior art (DEPTNO, COUNT_SAL, and SUM_SAL). The column SAL is defined as a unique internal "type," such as an "intermediate average" type in an Oracle database. This unique internal type allows the column SAL to include AVG_intermediate values (intermediate average values) in a single column that contains the count and sum of salaries according to an internal data format, instead of the two colums in the prior art (one containing the count and the other containing the sum).

AVG_final takes intermediate average values as input and produces the final averages. Note that AVG_intermediate and AVG_final are simply components of the existing AVG function. Splitting the aggregate functions into separate intermediate aggregate and final aggregate functions after the tablescan and before the partitioning improves the scalability of the parallel processing. The use of the internal representations of the intermediate aggregate values (namely non-SQL data types) in the inter-process communication mechanism also improves scalability.

Figure 3:
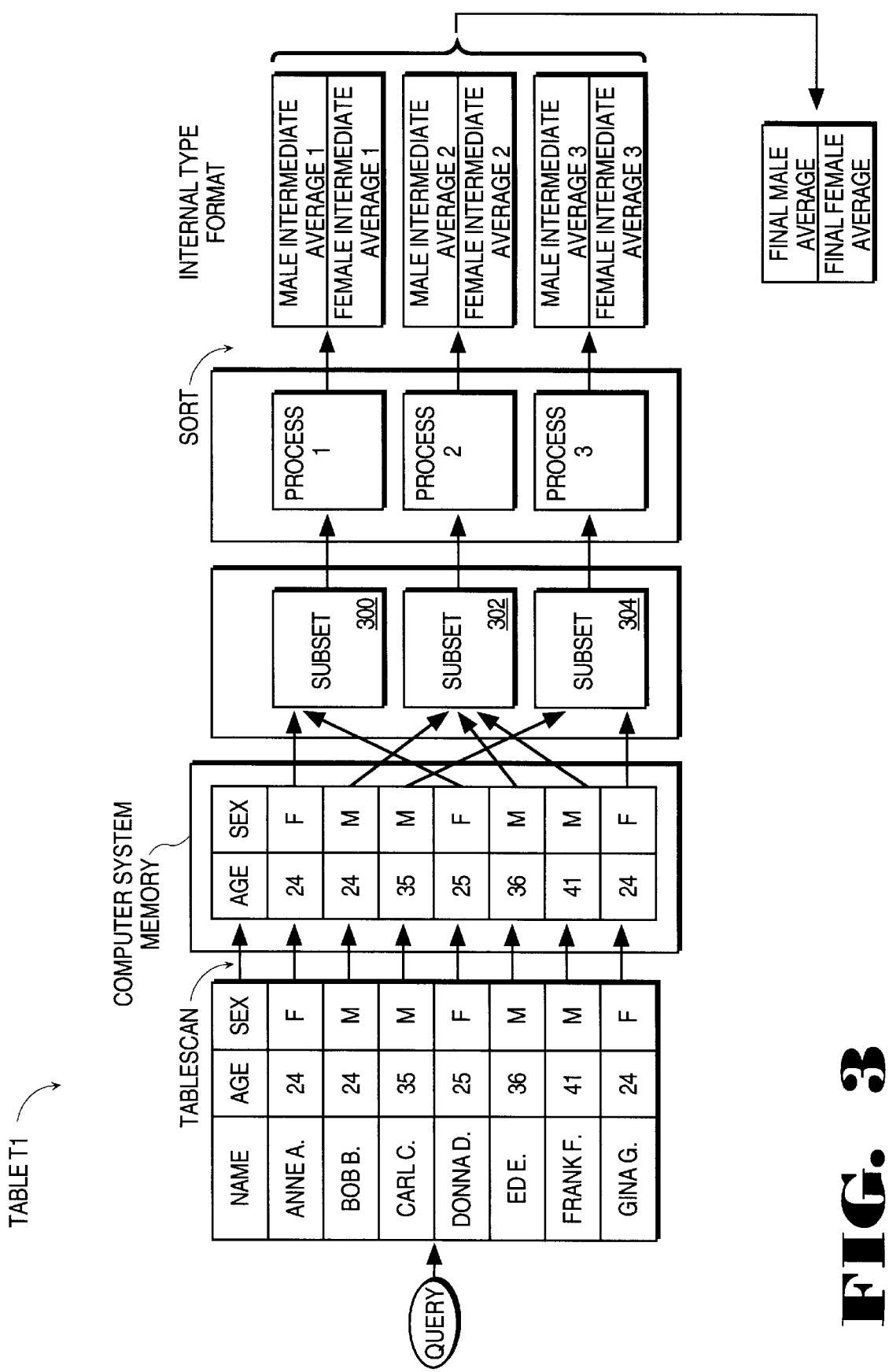
FIG. 3 illustrates an example of one embodiment of the present invention.

An example of one embodiment of the present invention is illustrated in FIG. 3. In this example, the query "SELECT AVG (AGE) FROM EMP GROUP BY SEX" is run against table T1. This query effectively requests the average age of employees grouped by sex. A "key value" in this context is a unique identifier for a set of data, as defined by the query to the table. Thus, in this example, the query specifies sorting by sex, thus effectively defining two unique key values, namely male and female.

As illustrated in FIG. 3, Table Tl includes names and ages of employees in a company. A tablescan is performed, and based on the tablescan, a set of data is retrieved from table T1 into memory 204 of computer system 200. The set of data retrieved is divided into smaller subsets of data: subsets 300, 302 and 304 in this example. Each subset of data is then assigned to a process according to a predetermined mapping function.

As illustrated in FIG. 3, the subsets of data are assigned to a process according to a predetermined mapping function. In the illustrated example, Subset 300 is assigned to process 1, subset 302 is assigned to process 2, and subset 304 is assigned to process 3. In this embodiment, the predetermined mapping function is a hash function. Alternate mapping functions may also be used. The division of data into subsets does not include a sorting step, as in the prior art. In this example, each subset of data includes rows containing both male and female data items.

Each process set then performs an intermediate aggregation according to the first serial query : "SELECT SEX, AVG_intermediate (AGE) FROM emp_subset GROUP BY SEX." The results of the first serial query are then sorted and passed to a second process set and the second process set performs the final query: "SELECT AVG_final (T1.AGL) FROM T1 GROUP BY SEX." The final output is an average age for males and an average age for females.

Figure 4:
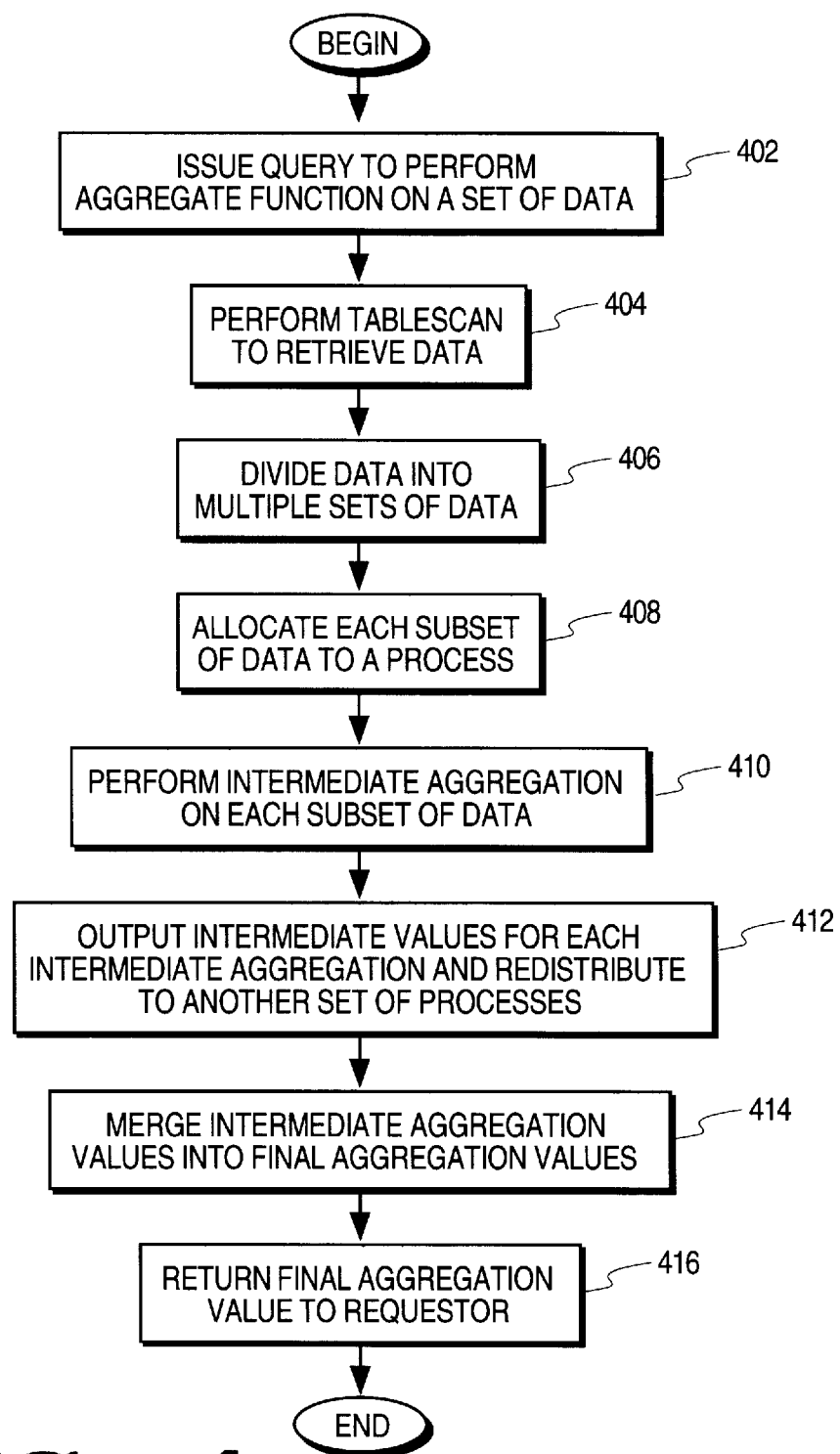
FIG. 4 is a flow chart illustrating the steps performed according to one embodiment of the present invention.

FIG. 4 is a flow chart illustrating one embodiment of the present invention. In step 402, a query is issued to perform an aggregate function on a set of data. A tablescan is then performed in step 404 to retrieve the appropriate set of data from table 100 into memory 104 of computer system 100. The retrieved data is divided into multiple subsets of data in step 406, and in step 408, each subset of data is assigned to a process according to a predetermined mapping function. In step 410, intermediate aggregations are performed on each subset of data by each of the processes, and in step 412, intermediate values for each intermediate aggregation are output and redistributed to another set of processes. In step 414, when the intermediate aggregation processing is complete, the intermediate values are merged into a final aggregation values for each key. Finally, in step 416, the final aggregation values are returned to the requester.

Thus, an improved method for processing parallel queries is disclosed. The specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for parallel processing aggregate functions in a computing system, said aggregate functions being performed on a set of data, the computer-implemented method comprising the steps of:

partitioning said set of data stored in an external type format into multiple subsets of data;

assigning each of said multiple subsets of data to one of a plurality of processes;

said plurality of processes performing intermediate aggregations and conversions in parallel on each of said multiple subsets of data, each of said intermediate aggregations yielding at least one intermediate value, wherein said at least one intermediate value is represented in an internal type format; and merging said at least one intermediate value from each of said imtermediate aggregations and converting into a final aggregation value stored in said external type format.

2. The computer-implemented method of claim 1 wherein said step of performing intermediate aggregations in parallel on each of said multiple subsets of data includes the step of sorting each of said multiple subsets of data.

3. The computer-implemented method of claim 1 wherein said aggregate functions are linear aggregate functions.

4. The computer-implemented method of claim 1 wherein said step of performing intermediate aggregations in parallel on each of said multiple subsets of data includes the step of converting each of said multiple subsets of data into an internal representation.

5. The computer-implemented method of claim 1 wherein said aggregate functions include one or more of MAX, MIN, AVG, SUM, STDDEV, VARIANCE and COUNT.

6. The computer-implemented method of claim 1 wherein said step of assigning each of said multiple subsets of data to one of said plurality of processes includes the step of assigning each of said multiple subsets of data to one of said plurality of processes according to a predetermined mapping function.

7. The computer-implemented method of claim 6 wherein said predetermined mapping function is a hash function.

8. A computer system for parallel processing aggregate functions, said aggregate functions being performed on a set of data stored in an external type format, said computer system comprising:

a processor;

a plurality of process spawned by the processor; processing logic for, partitioning said set of data into multiple subsets of data;

assigning each of said multiple subsets of data to one of said plurality of processes;

said plurality of processes performing intermediate aggregations and conversions in parallel on each of said multiple subsets of data, each of said intermediate aggregations yielding at least one intermediate value, wherein said at least one intermediate value is represented in an internal type format; and merging said at least one intermediate value from each of said intermediate aggregations and converting into a final aggregation value stored in said external type format.

9. The computer system of claim 8 wherein said aggregate functions are linear aggregate functions.

10. The computer system of claim 8 wherein processing logic also converts each of said multiple subsets of data into an internal representation.

11. The computer system of claim 8 wherein said aggregate functions include one or more or MAX, MIN, AVG, SUM, STDDEV, VARIANCE and COUNT.

12. The computer system of claim 8 wherein said processor logic for assigning each of said multiple subsets of data to one of said plurality of processes includes processor logic for assigning each of said multiple subsets of data to one of said plurality of processes according to a predetermined mapping function.

13. The computer system of claim 12 wherein said predetermined mapping function is a hash function.

14. The computer system of claim 8 wherein said processing logic further sorts each of said multiple subsets of data.

15. A machine readable medium having stored thereon data representing, sequences of instructions, which when executed by a computer system, cause said computer system to perform the steps of:

partitioning a set of data stored in an external type format into multiple subsets of data;

assigning each of said multiple subsets of data to one of a plurality of precesses;

said plurality of precesses performing intermediate aggregations and conversions in parallel on each of said multiple subsets of data, each of said intermediate aggregations yielding at least one intermediate value, wherein said at least one intermediate value is represented in an internal type format; and merging said at least one intermediate value from each of said intermediate aggregations and converting into a final aggregation value stored in said external type format.

16. The machine readable medium of claim 15 wherein said step of performing intermediate aggregations in parallel on each of said multiple subsets of data includes the steps of converting each of said multiple subsets of data into an internal representation.

17. The machine readable medium of claim 15 wherein said aggregate functions include one or more of MAX, MIN, AVG, SUM, STDDEV, VARIANCE and COUNT.

18. The machine readable medium of claim 15 wherein said predetermined mapping function is a hash function.

19. The machine readable medium of claim 15 wherein said step of performing intermediate aggregations in parallel on each of said multiple subsets of data includes the step of sorting each of said multiple subsets of data.

20. The machine readable medium of claim 15 wherein said aggregate functions are linear aggregate functions.

* * * * *